(12) United States Patent
Perry et al.

(10) Patent No.: US 11,893,828 B2
(45) Date of Patent: Feb. 6, 2024

(54) SYSTEM AND METHOD FOR IMAGE DE-IDENTIFICATION

(71) Applicant: DE-IDENTIFICATION LTD., Tel Aviv (IL)

(72) Inventors: Gil Perry, Tel Aviv (IL); Sella Blondheim, Tel Aviv (IL); Eliran Kuta, Tel Aviv (IL); Yoav Hacohen, Jerusalem (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 0 days.

(21) Appl. No.: 16/619,106

(22) PCT Filed: Jun. 4, 2018

(86) PCT No.: PCT/IL2018/050607
§ 371 (c)(1),
(2) Date: Dec. 4, 2019

(87) PCT Pub. No.: WO2018/225061
PCT Pub. Date: Dec. 13, 2018

(65) Prior Publication Data
US 2020/0097767 A1 Mar. 26, 2020

Related U.S. Application Data

(60) Provisional application No. 62/621,723, filed on Jan. 25, 2018.

(30) Foreign Application Priority Data

Jun. 4, 2017 (IL) .......................................... 252657

(51) Int. Cl.
G06V 40/16 (2022.01)
G06V 40/19 (2022.01)
(Continued)

(52) U.S. Cl.
CPC .......... *G06V 40/171* (2022.01); *G06F 18/214* (2023.01); *G06F 18/2178* (2023.01);
(Continued)

(58) Field of Classification Search
CPC .. G06K 9/6256; G06K 9/6263; G06K 9/6215; G06K 9/00288; G06K 9/00604; G06K 9/00281; G06K 9/00248
See application file for complete search history.

(56) References Cited

U.S. PATENT DOCUMENTS 6,278,791 B1    8/2001    Honsinger et al.
8,270,718 B2    9/2012    Drory et al.
(Continued)

FOREIGN PATENT DOCUMENTS

EP    3451209    3/2019
KR    102123248    6/2020
(Continued)

OTHER PUBLICATIONS

Brkic et al., "I Know That Person: Generative Full Body and Face De-Identification of People in Images", 2017 (Year: 2017).*
(Continued)

*Primary Examiner* — Ruiping Li
(74) *Attorney, Agent, or Firm* — PEARL COHEN ZEDEK LATZER BARATZ LLP

(57) ABSTRACT

System and method for training a human perception predictor to determine level of perceived similarity between data samples, the method including: receiving at least one media file, determining at least one identification region for each media file, applying at least one transformation on each identification region for each media file until at least one modified media file is created, receiving input regarding similarity between each modified media file and the corresponding received media file, and training a machine learn-
(Continued)

ing model with an objective function configured to predict similarity between media files by a human observer in accordance with the received input.

12 Claims, 10 Drawing Sheets

(51) Int. Cl.

| | |
|---|---|
| G06F 18/214 | (2023.01) |
| G06F 18/22 | (2023.01) |
| G06F 18/21 | (2023.01) |
| G06V 10/74 | (2022.01) |
| G06V 10/774 | (2022.01) |
| G06V 10/778 | (2022.01) |

(52) U.S. Cl.
CPC ............ *G06F 18/22* (2023.01); *G06V 10/761* (2022.01); *G06V 10/774* (2022.01); *G06V 10/7784* (2022.01); *G06V 40/165* (2022.01); *G06V 40/172* (2022.01); *G06V 40/19* (2022.01)

(56) References Cited

U.S. PATENT DOCUMENTS

| | | |
|---|---|---|
| 9,105,119 B2 | 8/2015 | Whitehill et al. |
| 2007/0236513 A1 | 10/2007 | Hedenstroem et al. |
| 2010/0074525 A1 | 3/2010 | Drory et al. |
| 2011/0123118 A1 | 5/2011 | Nayar et al. |
| 2012/0177248 A1 | 7/2012 | Shuster et al. |
| 2012/0288166 A1 | 11/2012 | Sun et al. |
| 2014/0328547 A1 | 11/2014 | Whitehill et al. |
| 2015/0261995 A1 | 9/2015 | Hudgins |
| 2015/0324633 A1 | 11/2015 | Whitehill et al. |
| 2017/0301121 A1* | 10/2017 | Whitehill ............ G06K 9/00228 |
| 2017/0302661 A1 | 10/2017 | Connell, II et al. |
| 2019/0188562 A1 | 6/2019 | Edwards et al. |
| 2019/0238568 A1 | 8/2019 | Goswami et al. |
| 2019/0332850 A1 | 10/2019 | Sharma et al. |
| 2020/0097767 A1 | 3/2020 | Perry et al. |

FOREIGN PATENT DOCUMENTS

| | | |
|---|---|---|
| MX | 2014015326 | 3/2018 |
| WO | WO 2015/039084 | 3/2015 |
| WO | WO 2015039086 | 3/2015 |
| WO | WO 2016/107651 | 7/2016 |
| WO | WO 2018/225061 | 12/2018 |
| WO | WO 2019/014487 | 1/2019 |

OTHER PUBLICATIONS

Newton EM, Sweeney L, Malin B. Preserving privacy by de-identifying facial images. IEEE transactions on Knowledge and Data Engineering. Jan. 10, 2005;17(2):232-43. Newton et al., Jan. 10, 2005.

European Search Report for Application No. EP20202094.7 dated Mar. 22, 2021.

Search Report for Application No. PCT/IL2020/051287 dated Mar. 25, 2021.

Search Report for Application No. PCT/IL2020/051291 dated Jan. 25, 2021.

Ren, Zhongzheng; Lee, Yong Jae; Ryoo. Learning to Anonymize Faces for Privacy Preserving Action Detection. Eprint arXiv:1803.11556, Jul. 26, 2018.

Letournel, Geoffrey; Bugeau, Aur?lie; Ta, Vinh-Thong; Domenger, Jean-Philippe. Face De-identification with Expressions Preservations. International Conference on Image Processing (ICIP) 2015, Sep. 2015.

PCT Search Report for Application No. PCT/IL2020/051286, dated Mar. 18, 2021.

Justus Thies et al. "Face2Face: Real-time Face Capture and Reenactment of RGB Videos" CVPR2016, Jul. 29, 2020.

Naruniec et al. "High-Resolution Neural Face Swapping for Visual Effects" vol. 39 No. 4 (2020).

Hyeongwoo Kim et al. "Deep Video Portraits" ACM Transactions on Graphics (TOG) vol. 37, No. 4, May 29, 2018.

Thies et al. "Deferred Neural Rendering: Image Synthesis using Neural Textur" Apr. 28, 2019.

Thies et al. "Neural Voice Puppetry: Audio-driven Facial Reenactment" arXiv preprint arXiv:1912.05566 Dec. 11, 2019.

Fried et al. "Text-based editing of talking-head video" ACM Transactions on Graphics vol. 38 Issue 4 Article No. 68, pp. 1-14, Jul. 4, 2019.

Liang Du et al. "GARP-Face: Balancing Privacy Protection and Utility Preservation in Face De-identification" IEEE International Joint Conference on Biometrics, Clearwater, FL, 2014, pp. 1-8.

Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.

Jourabloo et al. "Attribute Preserved Face De-identification" 2015 International Conference on Biometrics (ICB), Phuket, 2015, pp. 278-285.

Meng et al. "Face De-identification for Privacy Protection" 2014 37th International Convention on Information and Communication Technology, Electronics and Microelectronics (MIPRO), Opatija, 2014, pp. 1234-1239.

Gross et al. "Face De-Identification" In: Senior A. (eds) Protecting Privacy in Video Surveillance. pp 129-146, Springer, London.

Bitouk et el. "Face Swapping: Automatically Replacing Faces in Photographs" ACM Trans. Graph. 27, 3, Aug. 2008, pp. 1-8.

Muraki et al. "Anonymizing Face Images by Using Similarity-Based Metric" 2013 International Conference on Availability, Reliability and Security, Regensburg, 2013, pp. 517-524.

Chi et al. "Facial Image De-Identification using Identity Subspace Decomposition" 2014 IEEE International Conference on Acoustics, Speech and Signal Processing (ICASSP), Florence, 2014, pp. 524-528.

Gross, Ralph, et al. "Multi-pie." Image and Vision Computing 28.5 (2010): 807-813.

Yang, Shuo, et al. "Wider face: A face detection benchmark." Proceedings of the IEEE conference on computer vision and pattern recognition. 2016.

Kingma, Diederik P., and Jimmy Lei Ba. "Adam: A Method for Stochastic Optimization." (2015). ICLR 2015.

Akhtar, Naveed, and Ajmal Mian. "Threat of adversarial attacks on deep learning in computer vision: A survey." IEEE Access 6 (2018): 14410-14430.

Carlini, Nicholas, and David Wagner. "Towards evaluating the robustness of neural networks." 2017 IEEE Symposium on Security and Privacy (SP). IEEE, 2017.

Baluja, Shumeet, and Ian Fischer. "Adversarial transformation networks: Learning to generate adversarial examples." arXiv preprint arXiv:1703.09387 (2017).

Das, Nilaksh, et al. "Keeping the bad guys out: Protecting and vaccinating deep learning with jpeg compression." arXiv preprint arXiv:1705.02900 (2017).

Le, Vuong, et al. "Interactive facial feature localization." European conference on computer vision. Springer, Berlin, Heidelberg, 2012.

Messer, Kieron, et al. "XM2VTSDB: The extended M2VTS database." Second international conference on audio and video- based biometric person authentication. vol. 964.1999.

Phillips, P. Jonathon, et al. "Overview of the face recognition grand challenge." 2005 IEEE computer society conference on computer vision and pattern recognition (CVPR'05). vol. 1. IEEE, 2005.

Dziugaite, Gintare Karolina, Zoubin Ghahramani, and Daniel M. Roy. "A study of the effect of jpg compression on adversarial images." arXiv preprint arXiv:1608.00853 (2016).

Esteva, Andre. "Dermatologist-level classification of skin cancer with deep neural networks. Enhancing the Expert." Stanford Uni-

(56) References Cited

OTHER PUBLICATIONS versity. Slide Presentation. Jun. 8, 2017. URL: htttps://pdfs.semanticscholar.org/0d0e/e35c1b05868c1bc9494a202dce4b7f414370.pdf.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Ramanan, Deva, and Xiangxin Zhu. "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Perez et al. "Face recognition and De-Identification in the frequency domain" Dec. 31, 2016.
Sendik "What's in a face? Metric learning for face characterization" Computer Graphics Forum, 2019.
He et al. "AttGAN: Facial Attribute Editing by Only Changing What You Want" Jul. 25, 2018.
Chi Hehua et al. "Face de identification using facial identity preserving features" Dec. 14, 2015.
International Search Report for App. No. PCT/IL2020/050907 dated Nov. 29, 2020.
International Search Report for App. No. PCT/IL2019/050993 dated Nov. 27, 2019.
European Search Report for App. No. 18813726.9 dated Feb. 8, 2021.
International Search Report of Application No. PCT/IL2018/050607 dated Jun. 4, 2018.
Yuezen Li et al.; De-Identification without Losing Faces; Arxiv Org, Cornell University Library, 201 Olin Library Cornell University Ithaca NY 14853, Feb. 12, 2019, XP081027993.
Blavz Meden et al; Face Deidentification with Generative Deep Neural Networks; Arxiv Org, Cornell University Library, 201 Olin Library Cornell University Ithaca NY 14853, Jul. 28, 2017, XP080959801.
Muraki, Tomonari et al; "Controlling Tradeoff between Security and Usability in Anonymizing Face Images", Security Management, Jan. 25, 2015, vol. 28, No. 3 pp. 3-16.
European Search Report of Application No. 20854071.6 dated Aug. 14, 2023.

* cited by examiner

DE-IDENTIFICATION MODULE 520

GEOMETRY DE-IDENTIFICATOR 530

FEATURES DE-IDENTIFICATOR 540

DISTANCE VARIATION MODULE 550

NOISE ADDITION MODULE 560

Fig. 7

SYSTEM AND METHOD FOR IMAGE DE-IDENTIFICATION

CROSS-REFERENCE TO RELATED APPLICATIONS

This application is a National Phase Application of PCT International Application No. PCT/IL2018/050607, International Filing Date Jun. 4, 2018, claiming the benefit of U.S. Patent Application No. 62/621,723, filed Jan. 25, 2018, and claiming Priority of Israeli Application No. 252657, filed Jun. 4, 2017, which are hereby incorporated by reference.

FIELD OF THE INVENTION

The present invention generally relates to the field of computer vision and image processing. More particularly, the present invention relates to systems and methods for synthesizing and/or modifying features in images to limit recognition by classifier algorithms.

BACKGROUND OF THE INVENTION

The use of internet communication and social media have increased in recent years. A plurality of pictures and videos are being uploaded to public servers and enable public access, being deliberately published or not. Simultaneously, image processing and analyzing techniques provide simple face recognition and identification, thus enabling the use of such public media (e.g., pictures and videos) for identifying and possibly tracking generally any desired individual.

Furthermore, personal attributes, such as age, health conditions, and sexual preferences are widely considered as private information that should be protected and with the recent advancements in machine learning algorithms, it has been proven possible to estimate such personal information from a portrait image by machines. With the proliferation of facial images in social networks and internet communication, such personal details have become available without people's intention to share it.

Various techniques are known for enabling publication of images while limiting the ability of identifying individuals in the published images. These techniques enable companies to publish images while protecting privacy of people that accidentally appear in the frame, or allow individuals to publish their pictures in privacy.

US 2011/0123118 describe methods, systems, and media for swapping faces in images. A detected face and face data corresponding to an input image is received. A pose bin associated with the detected face is then identified based on the face data. Next, the detected face is aligned to a generic face associated with the pose bin. At least a portion of a candidate face associated with the pose bin is selected. The at least a portion of the candidate face is then copied to a copy of the input image that is aligned with the generic image to form a swapped-face image. The swapped-face image is next aligned to the input image to form an output image, and then the output image is outputted to a display.

WO 2016/107651 relates to a method and a system for preserving the privacy of persons detected by a camera of a smart glass. The system comprises a camera module for taking at least one image of a face by means of the camera of the smart glass and a detection module for detecting a face in the image taken by the camera. A state module is provided for generating a state signal if a face is detected in the image. A tracking module is provided for tracking features of the detected face in case a state signal is generated.

US 2007/0236513 discloses a method and system for image blending. A destination image is received, the destination image including an image portion to be replaced and having characteristics associated with the identified image portion. A source image is also received. An image portion of the source image to be inserted into the destination image is identified. Where necessary, parameters of the image portion to be inserted are transformed to match those of the image portion to be replaced. The image portion to be inserted is then blended into the destination image in dependence on the image portion to be replaced and its associated characteristics.

U.S. Pat. No. 8,270,718 describes a method for manipulating an image, the method includes: capturing image information representative of an image that includes images of textual characters, recognizing the textual characters by applying optical character recognition, identifying the layout of the image, and applying at least one de-identification process on textual characters of interest to provide de-identification process results.

U.S. Pat. No. 9,105,119 describes a method that facilitates training of an automatic facial expression recognition system through distributed anonymization of facial images, thereby allowing people to submit their own facial images without divulging their identities. Original facial images are accessed and perturbed to generate synthesized facial images. Personal identities contained in the original facial images are no longer discernible from the synthesized facial images. At the same time, each synthesized facial image preserves at least part of the emotional expression contained in the corresponding original facial image.

None of these publications allow de-identification of faces in images (or video data) that eliminates, or at least significantly reduces, ability of face recognition and/or identifying algorithms to determine identity of individuals in the processed images while maintaining similarity and/or recognition of images by a human user.

SUMMARY OF THE INVENTION

Embodiments of the present invention utilizes selective image processing techniques configured for maximizing and/or maintaining resemblance of the images to the corresponding individuals, while preventing and/or significantly limiting identification by computerized algorithms.

Some embodiments utilize pre-provided data on a plurality of face models for use in de-identification processing of one or more selected faces in one or more digital images. To this end, the face models may be utilized for applying a set of selected variations on image data associated with a selected face to change geometrical appearance and/or one or more selected facial features in accordance with one or more selected face models. By applying limited change to the selected face, some embodiments may be configured to maximize and/or maintain certain resemblance between a processed image and the original individual face. This enables users to protect their identity when uploading images, while being at least partially recognizable to friends and other people looking at the processed images. In some embodiments, companies and organizations may protect identify (e.g., face) databases, while maintaining their usability. Generally, some embodiments may be directed at affecting image data for varying shape, color and/or texture, geometry and facial features such that the resulting image resembles the input image data such that a person who recognizes an individual in an image, when looking at de-identified output image by itself, will not see the difference, would recognize the individual in the output image and would not notice the output image was modified (e.g., the image would look natural).

Embodiments of the present invention may be operated on one or more dedicated server systems, configured for receiving image data including selected images or image stream via a communication network, and for processing the received image data for de-identifying one or more faces appearing in the image data, and transmitting resulting image data back to the sender or to any other selected communication port for further use. Additionally, or alternatively, some embodiments may be operated partially or fully on a local computing system or electronic device, enabling to selectively or automatically de-identify faces in received and/or captured image data.

Thus, according to a broad aspect, the present invention provides a method for use in processing image data. The method including: receiving input image data associated with one or more images including one or more face regions, selecting an image region associated with a selected face and applying de-identification processing said selected region, said de-identification processing includes at least one of: i) geometry de-identification processing including: obtaining data associated with one or more geometry face-models from a storage unit containing pre-stored data, determining one or more geometry face-models having geometrical similarity measure being above a selected geometry threshold with respect to the selected face, selecting one or more geometrical features of the selected face and processing said image region for applying variation to said selected one or more geometrical features in accordance with corresponding features of the one or more obtained geometry face models to a predetermined geometry variation level, ii) feature de-identification processing including: selecting one or more facial features of the selected face and obtaining from a storage unit containing pre-stored set of feature face-models, one or more feature face-models having facial similarity measure with the selected face being above a selected feature similarity threshold, and processing the image region for applying variation to said one or more selected facial features using corresponding facial features of said selected one or more features face-models to a predetermined feature variation level, iii) optimized de-identification processing including: pre-training (or pre-computing) from a data set of facial images a low-dimensional parametric model (such as Autoencoder, PCA, or other linear or non-linear low-dimensional bases) to reconstruct facial image given a set of parameters, obtain the parameters representing the selected face as depicted in the input image, and modify the parameters in an optimization process (such as gradient descent) to represent a varied version of the facial image optimized with the objective to maximize and/or retain resemblance to the original face while reducing the recognition score of one or more face recognition systems below a certain threshold, generating an output image data wherein said selected image region presenting varied version of said selected face.

According to some embodiments, the method further includes receiving said input image data associated with said one or more images and processing said one or more images for determining one or more regions associated with human face in said one or more images.

In some embodiments, the data associated with one or more geometry face-models may include coded instructions for generating one or more geometry face-models in accordance with geometrical measure of the selected face.

According to some embodiments, said data associated with one or more geometry face-models may include coordinates data indicative of geometrical structure of one or more pre-stored geometry face-models. Alternatively or additionally, the face-models may include image and/or coordinates data.

According to some embodiments, said de-identification processing may further include distance variations including: selecting one or more pairs of facial features of the selected face, determining suitable distance variation for the selected pairs of facial features and applying the selected distance variation for varying one or more selected ratios of the selected face.

Said determining suitable distance may include affecting a selected ratio to be with a predetermined range of the golden ratio $\phi \approx 1.618$, and may further include applying said distance variation to two or more selected features and distance ratios between them.

According to some embodiments, said de-identification processing may further include detecting right and left eyes of the selected face and processing the image region for applying variation to distance between said left and right eyes by a selected value.

Said applying variation to distance between said left and right eyes may include determining distance measure between said left and right eyes, selecting a varied distance in accordance with aesthetic parameters and applying image processing technique for varying said distance between said left and right eyes.

According to some embodiments, said de-identification processing may include determining resemblance estimation using a similarity function pre-trained based on a dataset containing labeled pairs (and/or selected by a human operator in a supervised process). In some embodiments, said de-identification processing may provide an absolute answer (same or not same) and/or provide a score (e.g., similarity score on a scale 1-10) facial image where each pair contains an original and a modified version generated using the said low-dimensional parametric model, where the labels may be assigned by humans to reflect their perception of the pairs as being similar.

According to some embodiments, said de-identification processing may further include detecting right and left eyes of the selected face and processing said image region for enhancing or rotating said left and right eyes to a selected level.

Said enhancing or rotating may include applying one or more selected filters to said left and right eyes, said one or more filters being selected from: whitening eye regions, pupil brightness enhancement, pupil shining enhancement, enhancing symmetry, varying shadow level, and reducing wrinkles.

According to some embodiments, said de-identification processing may further include applying invisible noise layer (e.g. using adversarial machine learning) to said selected image region, said invisible layer includes one or more patterns of color variation having selected structure.

According to some embodiments, the method may further include applying face identification processing on said generated output image data and upon determining that said face identification succeeds above a predetermined threshold, selecting adjusted geometry variation level and feature variation level and repeating said de-identification processing with the selected variation levels.

According to some embodiments, said selecting said one or more facial features may include selecting one or more image regions associated with one or more facial feature including nose, ears, eyes, mouth, chin, cheeks and forehead, eyebrows, hair, skin, texture, scars, and marks. Selecting said one or more facial features may further include selecting at least two of said facial features and obtaining from said storage unit containing pre-stored set of feature face-models, at least two different feature face-models corresponding to said at least two selected facial features.

According to some embodiments, said processing the image region for applying variation to said one or more selected facial features may include using two or more features face-models and applying said variation in accordance with features of said two or more feature face-models.

According to some embodiments, said geometrical similarity measure may include data about similarity of point-to-point distance ratios between the selected face and a geometry face-model.

According to some embodiments, said processing said image region for applying variation to said selected one or more geometrical features includes aligning position of one or more selected candidate geometry face-models in accordance with position of said selected face, and applying image processing for varying distances between selected face features in accordance with the selected one or more selected candidate geometry face-models.

According to some embodiments, the method may further include processing said output image data for determining one or more general similarity measures between said output image data and the selected face in said input data, upon determining that said one or more general similarity measures exceeding a predetermined visual similarity threshold, operating said de-identification processing with reduced geometry variation level and feature variation level.

The one or more general similarity measures may include one or more of: peak signal-to-noise ratio (PSNR) similarity measure, histogram comparison and distances vector set measure, deep neural network trained on human vision ranking which predicts similarity score and related machine learning models and/or regressors.

According to one other broad aspect of the invention, the present invention provides a software product embedded in a computer readable medium and including computer executable instructions that, when executed by a processor, cause the processor to perform a method for face de-identification processing, the method including: receiving input image data associated with one or more images and processing said one or more images for determining one or more regions associated with human face in said one or more images, selecting an image region associated with a selected face and de-identification processing said selected region, said de-identification processing includes at least one of: i) geometry de-identification processing including: obtaining data associated with one or more geometry face-models from a storage unit containing pre-stored data, determining one or more geometry face-models having geometrical similarity measure being above a selected geometry threshold with respect to the selected face, selecting one or more geometrical features of the selected face and processing said image region for applying variation to said selected one or more geometrical features in accordance with corresponding features of the one or more obtained geometry face models to a predetermined geometry variation level, feature de-identification processing including: selecting one or more facial features of the selected face and obtaining from a storage unit containing pre-stored set of feature face-models, one or more feature face-models having facial similarity measure with the selected face being above a selected feature similarity threshold, and processing the image region for applying variation to said one or more selected facial features using corresponding facial features of said selected one or more features face-models to a predetermined feature variation level, iii) optimized de-identification processing including: pre-train (or pre-compute) from a data set of facial images a low-dimensional parametric model (such as Autoencoder, PCA, or other linear or non-linear low-dimensional bases) to reconstruct facial image given a set of parameters, obtain the parameters representing the selected face as depicted in the input image, and modify the parameters in an optimization process (such as gradient descent) to represent a varied version of the facial image optimized with the objective to maximize and/or retain resemblance to the original face while reducing the recognition score of one or more face recognition systems below a certain threshold, generating an output image data wherein said selected image region presenting varied version of said selected face. In some embodiments, the operation to maximize and/or retain resemblance to the original image may be carried out by a human user in a supervised process.

According to yet another broad aspect, the present invention provides a system for use in image processing, the system including at least one processing utility and is configured for receiving input image data and processing said input image data for varying one or more image regions corresponding with one or more selected faces for limiting recognizing identity of the one or more faces, the processing utility includes a de-identification module including one or more of: geometry de-identificator configured for obtaining pre-stored data associated with one or more geometry face models and varying one or more geometrical features of the selected face in accordance with geometry of the one or more face-models to a selected level, features de-identificator configured and operable for obtaining one or more pre-stored feature face models and varying one or more selected facial features of the selected face in accordance with corresponding features of the one or more face-models, distance variation module configured and operable for selecting two or more facial features and corresponding distance ratios between them, determining a suitable distance variation and applying selected distance variation to the selected facial features of the selected face, eye enhancer configured and operable for determining image region associated with right and left eyes in the selected face and applying selected variation to one or more of distance between eyes, eyes' orientation, eye coloring and shading around eyes in accordance with selected aesthetic parameters to a selected level, and noise addition module configured and operable for generating a noise layer and applying the noise layer on image region associated with the selected face to a selected level.

The system may be configured as a server system and associated with a storage utility storing data indicative of said pre-provided geometry and features face-models. Additionally, or alternatively, the system may be configured as a portable or handheld computing unit configured for applying de-identification processing to input image data. For example, the system may be associated with a camera unit (e.g. smartphone, or standalone "smart" camera) configured for applying de-identification processing on selected acquired images.

According to some embodiments, a de-identification method may include protection of personal attributes from being estimated, by significantly reducing the ability to associate a given facial image with the subject's true personal attributes. Such attributes may be physical and/or mental, permanent and/or temporary. These include age, health and mental condition, gender, sexual orientation, ethnicity, weight, height, pregnancy, mood/feelings, IQ and socio-economic variables.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 schematically exemplifies a de-identification module, according to some embodiments of the invention;

Figure 1A:
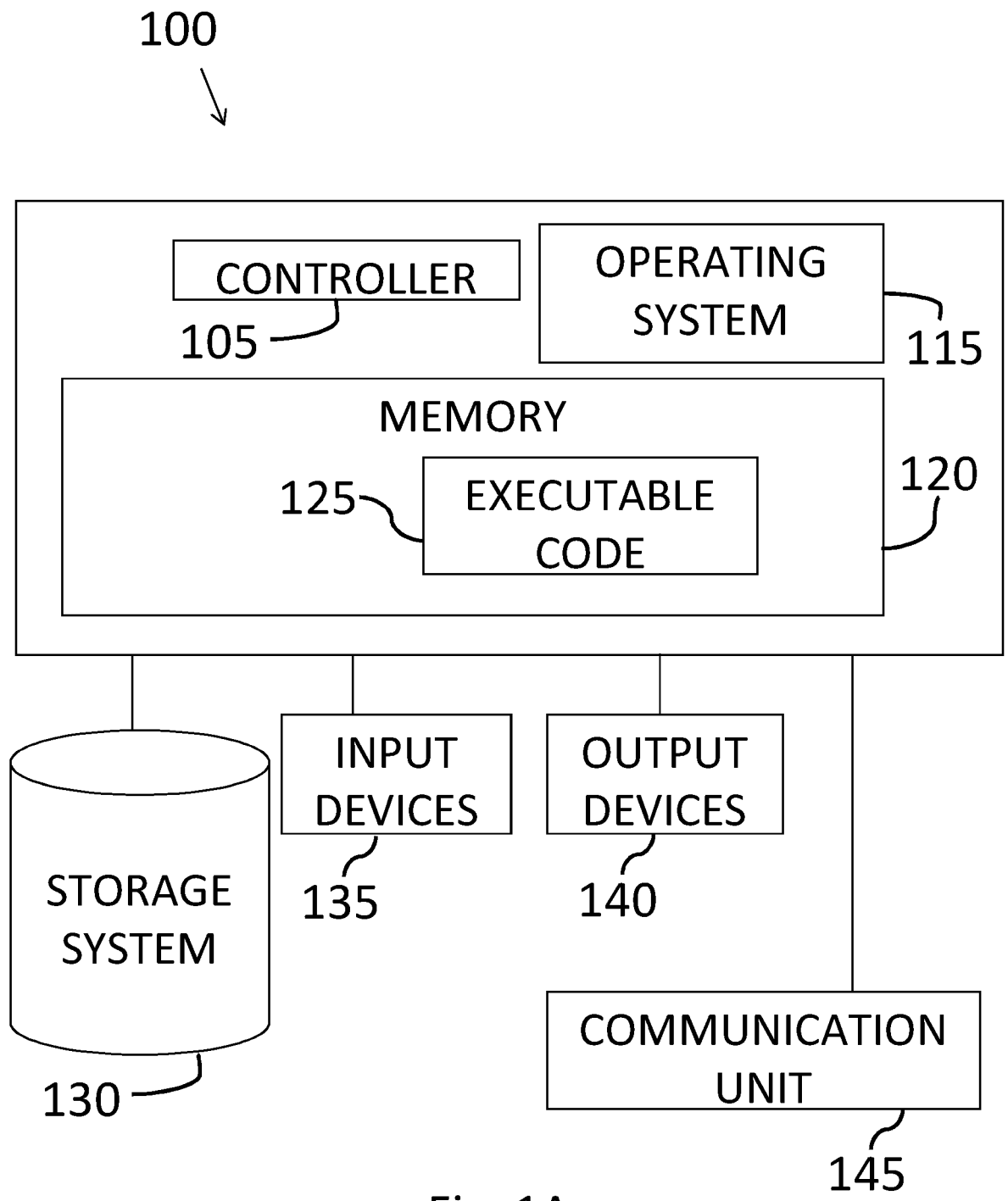
FIG. 1A shows a schematic block diagram of an example computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1A, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1A, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1A may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 1B:
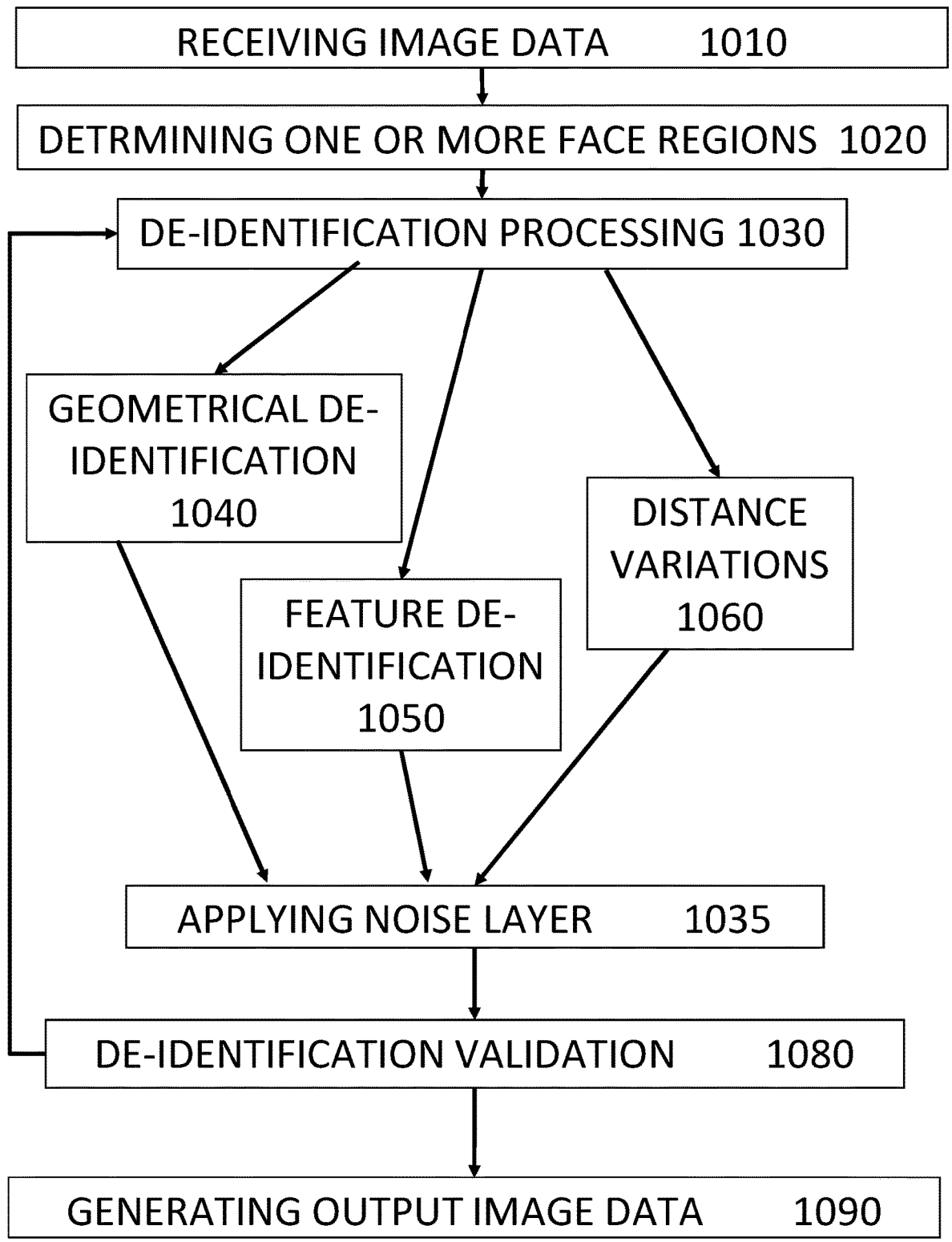
FIG. 1B schematically illustrates a technique for de-identification image data, according to some embodiments of the invention.

Reference is now made to FIG. 1B, which schematically illustrates a method or technique for de-identification image data, according to some embodiments of the invention. As indicated above, some embodiments may provide a method for use in processing image data and configured for eliminating, or at least significantly reducing, face recognitions algorithms' ability to identify face parameters from processed image data. Reference is made to FIG. 1B exemplifying the present technique in the form of a flow chart and to FIGS. 2-4 exemplifying different de-identification elements according to the present method or technique including geometrical de-identification (FIG. 2) feature de-identification (FIG. 3) and eye enhancement (FIG. 4).

As shown in FIG. 1B, the present method or technique enables processing of image data received 1010 from generally any source, for processing the image data by detecting one or more face regions 1020 within the image data and applying de-identification processing 1030 using one or more (generally two or more) de-identification variations. In some embodiments, the one or more face regions may be automatically aligned and/or processed for neutral facial expressions. The de-identification variations exemplified as geometrical (and/or morphological) de-identification 1040, and/or feature de-identification 1050, and/or distance variation 1060 (e.g., for facial feature) and/or eye enhancement and include certain processing selected for varying selected face region of the image data to prevent, or at least limit, ability of recognizing identity of a person in the image data using computerized image processing and especially face recognition techniques. Some embodiments may also perform de-identification validation 1080 to verify efficacy of the processing, after de-identification processing a modified output image may be generated 1090 and provided for use. In some embodiments, the de-identification variations may also include generative adversarial network (GAN) attacks in order to prevent future malicious attacks based on the recognized data. According to some embodiments, at least one face recognition parameter may be provided as input for the de-identification processing 1030. In some embodiments, at least one human vision similarity parameter (for instance obtained by training a machine learning model) may be provided as input for the de-identification processing 1030.

The output image data may be generally identical to the input image data other than one or more selected face regions that may be modified to prevent, or at least significantly limit, ability of computerized methods or techniques in determining identity associated with the one or more modified faces in the image data. Accordingly, the term "de-identification" as used herein is a general term relating to image processing configured for preventing computerized face recognition and/or identification techniques to identify faces in suitably processed image data and determine identity persons in the image data. Some embodiments may apply de-identification processing while maintaining as much similarity as possible to maintain appearance of the image data, and the one or more selected faces, such that it may be at least partially recognizable to human eyes and preferably seems similar.

Some embodiments may be operated by a computerized system utilizing one or more processing utilities and a memory/storage utility. Generally, such system may have access to a face-model storage utility, which may be stored locally or accessible through a communication network, including a plurality of pre-provided face-models having various parameters. For example, some embodiments may be applied by one or more server systems configured for receiving input image data 1010 via wired or wireless communication network, or by a local processing unit, e.g. associated with a camera unit, configured for applying de-identification processing to images in accordance with user preferences.

The received input image data may be a single image, collection of images that may be connected between them by one or more parameters such as location, identities of people appearing in the images and/or time of acquisition, or an image stream such as forming a video. Some embodiments may be configured to apply de-identification processing, in accordance with user preferences, on a plurality of images (connected by certain parameters or forming video) such that similar faces in different images may be processed similarly to maintain continuity of the group of images. Alternatively, each image may be processed separately to thereby further limit identification ability of identities at the cost of reducing connection between the images.

Some embodiments may utilize any known face detection technique for detecting one or more image regions associated with faces 1020. Some embodiments may utilize one or more object-class detection pre-trained for detecting objects associated with human face. Such face detection technique may typically be configured for focusing facial features such as identifying human eyes, and matching face region to determine the image region associated with a face. Some embodiments may be used for determining one or more face features as described further below.

Some embodiments may provide a user interface enabling a user or operator to select one or more faces for de-identification. For example, when an input image data is received 1010 and one or more face region may be determined 1020, the image data may be pre-processed for presenting to a user with marking on the face region. The user may thus be able to select one or more faces for de-identification or faces that need not be processed.

Upon selection of one or more image regions associated with human faces, some embodiments may operate for de-identification processing 1030 of the selected image regions. The de-identification processing utilizes selected image processing techniques for applying variations in one or more, generally two or more, fields associated with face identification techniques to thereby prevent, or at least significantly limit, identifying a person using computerized face recognition techniques. The de-identification processing may include one or more types of image variations, and preferably include two or more image variations, providing variation of geometry, facial features and/or eyes of the selected face. FIGS. 2-5 exemplify the techniques associated with geometry de-identification (in FIG. 2), feature de-identification (in FIG. 3), facial feature distance variation (in FIG. 4) and eye enhancement (in FIG. 5) according to some embodiments.

Additionally, according to some embodiments, the de-identification may also include applying noise layer onto the image region 1035. The noise layer may be applied with noise amplitude of a few percent of the image region color intensity and include a random noise or adversarial noise pattern or pattern associated with selected shape/structure being a face (e.g. selected face-model) or any other object.

After the de-identification processing some embodiments may generally validate the de-identification 1080 and generate output image data 1090 in which the selected face may be varied in a way that maximize and/or maintain certain resemblance with the person's appearance but such that may not be recognized by face recognition techniques. If the de-identification validation 1080 is insufficient, either since the processed image can be identified to determine identity of the person appearing in the image, or if the image is over processed and does not maintain sufficient similarity to the person's face, e.g. in terms of human vision/psychology, the image region may be processed again with corresponding variations to predetermined thresholds as described in more details below.

The geometrical and feature de-identification processing (1040 and 1050, and exemplified in more details in FIGS. 2 and 3) typically utilize pre-provided data stored in one or more storage utilities/database, which may be directly connected to a processing utility operating the present method or technique and/or accessible through suitable communication network. The pre-provided data may include data on a plurality of face-models having different parameters, and in some embodiments may include data (e.g., coded instructions) suitable for generating face model utilizing a set of geometrical parameters and color tone data. The pre-stored data may include geometry face-models for use in geometry variation and feature face-models for use feature variation. Face model provided in image form may be used for either geometry or features variations in accordance with parameters of the face selected for de-identification. However, in some embodiments the geometry face-models may include data about facial coordinates, e.g. in a list of coordinates marking/indicating vectorial locations of specific marking points, while not including actual image data.

The face-models, and feature face-models in particular, may generally include face-models associated with different sex (male models and female models), skin color variations, age variation (based on age approximation techniques), different ethnicities, and face shape and structures. The face-models may be provided from images, and or rendered from synthetic models being computer-generated face models. Further, in some embodiments, the face-models may include certain three-dimensional representation enabling alignment of the face models with respect to selected face in various positions and orientations.

Figure 2:
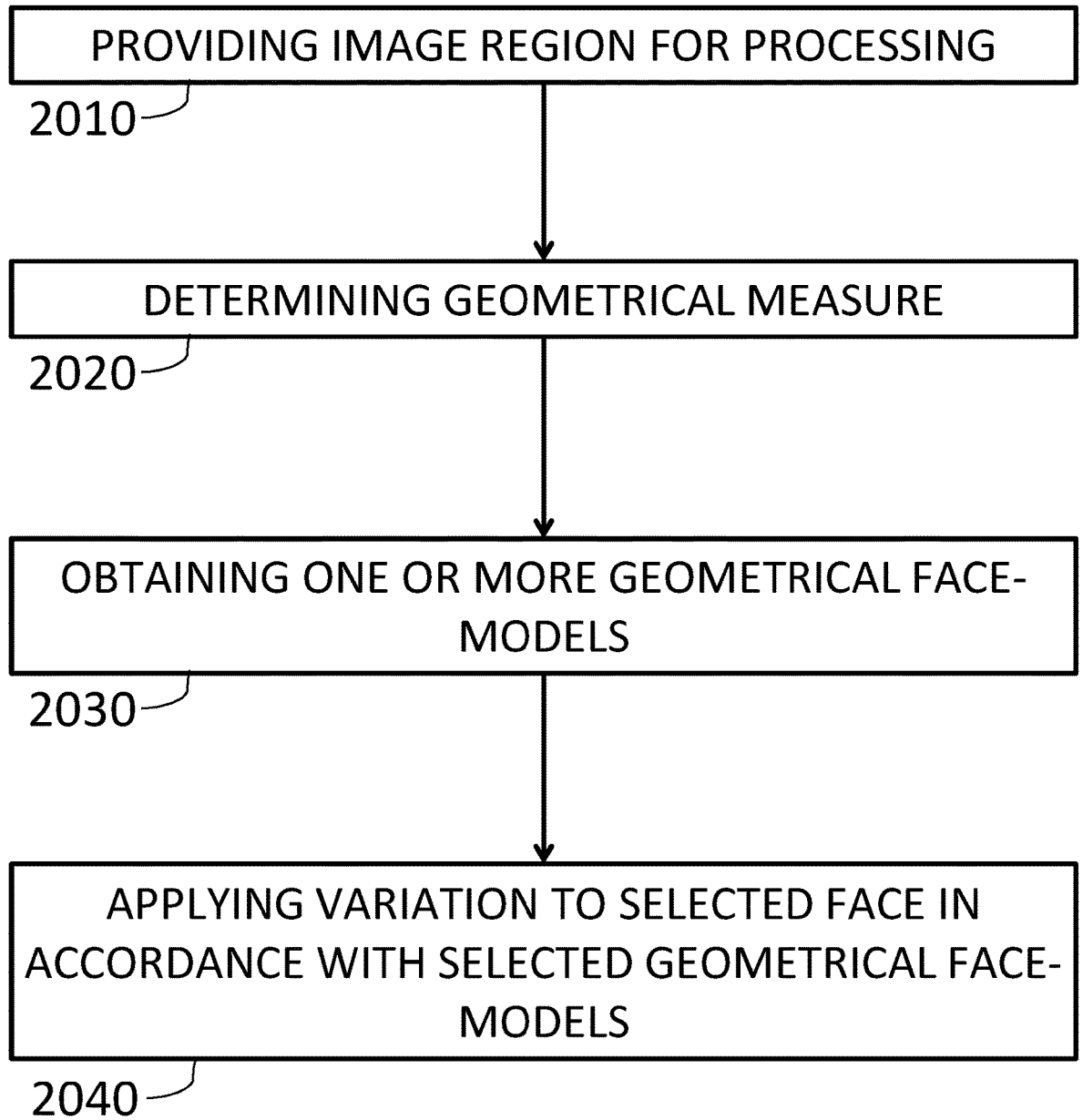
FIG. 2 schematically illustrates geometry de-identification technique, according to some embodiments of the invention.

Reference is made to FIG. 2, exemplifying geometry de-identification processing. As shown, the geometry de-identification technique relates to processing of a selected image region associated with a face to be de-identified. Some embodiments include providing image region for geometry de-identification 2010 (which may be original image region or image region that have been processed by feature de-identification or eye enhancement, as further described below), determining a geometrical measure of the selected face 2020, obtaining one or more geometry face models 2030 and applying variation to geometry of the selected face in accordance with the obtained one or more geometry face-models 2040.

The geometrical measure 2020 of the selected face may generally include one or more parameters associated with face structure. Such parameters may be determined as absolute measurements, e.g. face width, distance between eyes, face height etc., or preferably determined as ratios between related measurements, such as face width-height ratio, ratio between eyes' distance and eyes' width, forehead ratio to face height etc.

In accordance with the determined geometrical measure, one or more geometrical face models may be selected and obtained 2030 from the pre-stored geometry face-models. The selected geometrical face model(s) may preferably be selected as having geometrical measure being as close as possible to that of the face to be de-identified. Accordingly, other parameters of the face models (such as color, age, sex etc.) may be ignored.

Additionally or alternatively, some embodiments may utilize pre-stored data/instructions for generating suitable face-model (for geometry and/or features' variation). The suitable face model may be generated using one or more geometrical and color tone parameters such as face size, selected distances (e.g. between eyes, ears, mouth to nose etc.), features' sizes and shape, and color variations and tone, and generated using one or more known techniques (e.g., such as "FaceGen.com"), and/or various machine/deep learning techniques. In these configurations, some embodiments may utilize obtaining access to pre-stored coded instructions, and using the determined geometrical and general (e.g., color tone) measures of the selected face in combination with the coded instructions for generating face-model suitable for geometry de-identification and/or feature de-identification of the selected face. It should be noted that in some embodiments where the so-generated face-model may be used for geometry variations, the face-model may be generated to provide coordinates only while omitting generation of skin color etc.

Some embodiments may further utilize image processing technique for varying or warping geometry of the selected face in accordance with the one or more obtained geometry face-models 2040, e.g. using affine transformation techniques. Although typically being a computerized processing, this may be explained hereinafter as actions with image elements for simplicity. To this end, an obtained face models may be placed as a layer on top of the selected face image region, and aligned or re-sized to fit the selected face as much as possible. Lines/edges of the selected face may be varied/warped to fit those of the face-model up to certain selected geometry threshold. For example, the nose width, eyes' distance, eyes' width or height, face width, forehead height, hair-line, chin line or any other line determining face geometry may be varied/warped in accordance with the selected face-model to a selected threshold. This may be applied using additional geometry face-models such that different face models provide slightly different variations of the selected face's geometry. It should be noted that selected face models may be used, rather than simple geometry variation, to maintain a natural appearance of the de-identified face, while the selected thresholds for variations and selection of geometrically resemblance of the face-models provide for maintaining certain similarity of the processed face to that of the original image data. The geometry variation threshold may be selected as a predetermined initial threshold (e.g. 10%, 15%, 20% or 25%) and varied in accordance with de-identification validation to be increased if identity of the person may still be detected, or decreased if resemblance is not sufficiently maintained.

Figure 3:
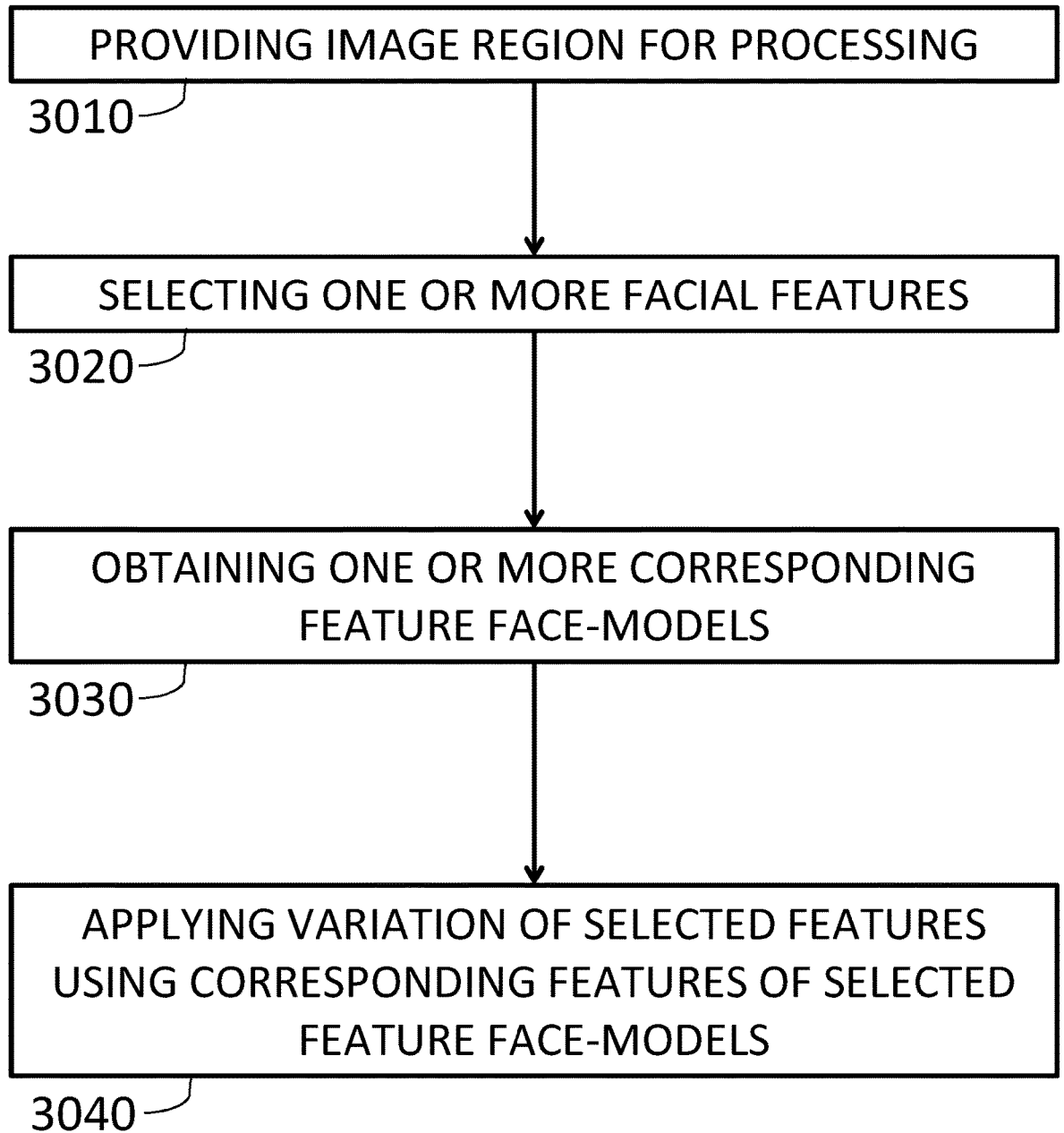
FIG. 3 schematically illustrates features de-identification technique, according to some embodiments of the invention.
Figure 4:
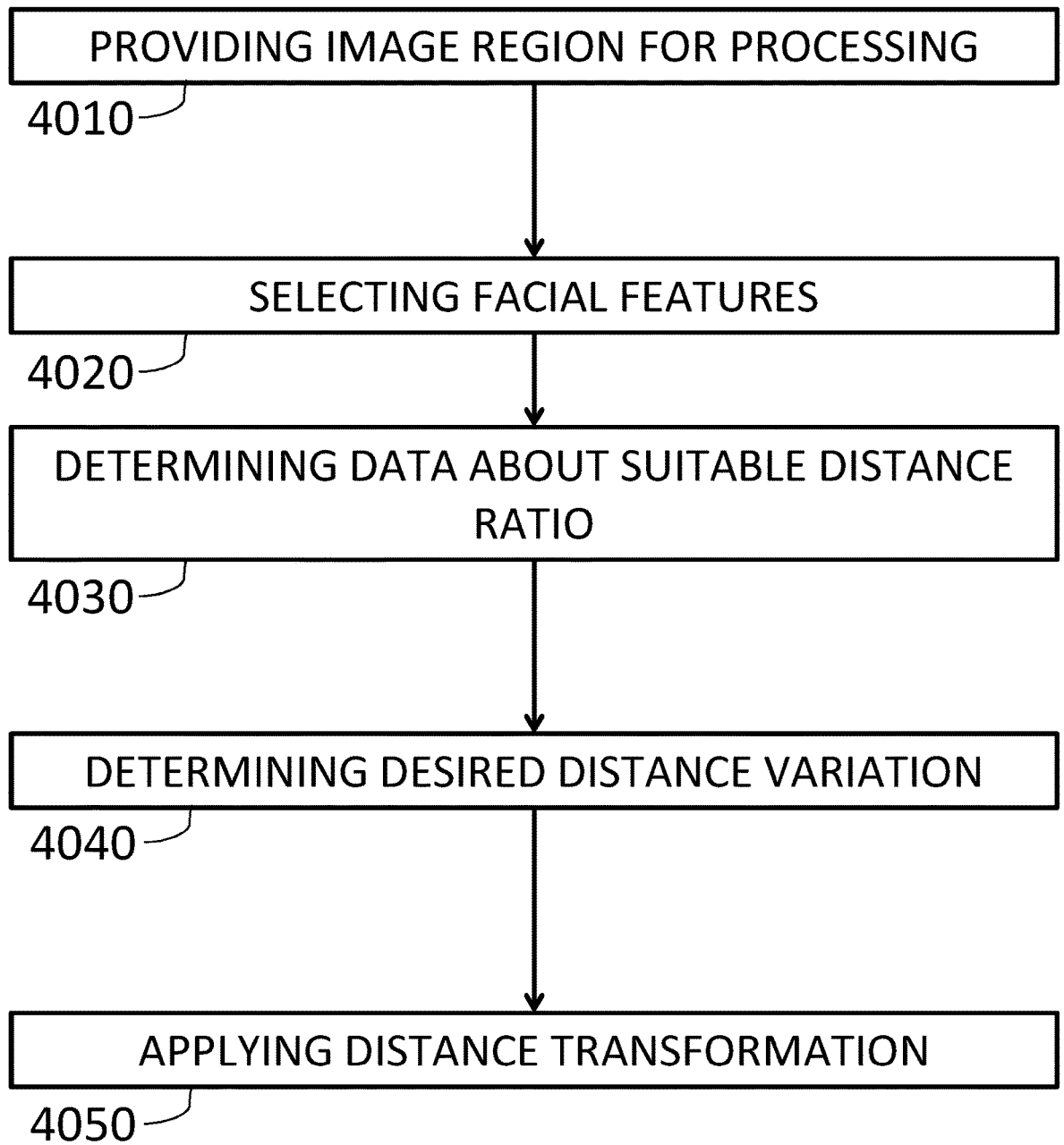
FIG. 4 schematically illustrates distance variation technique, according to some embodiments of the invention.

Additional variation associated with the de-identification processing relates to feature de-identification, this is exemplified in FIG. 3. The provided 3010 image region for processing may be that selected for de-identification or image region that have been processed for geometry de-identification and/or eye enhancement. The feature de-identification (and/or image morphing technique) may be applied to one or more selected features 3020 of the face such as eyes, ears, nose, chin, mouth, hairline, eyebrows, cheeks or any other selected facial feature. Generally, the feature de-identification is described herein as applied to a single selected feature, and may be applied one-by-one to several features independently. The number of features that are varied may be selected based on a predetermined initial parameter and may be varied based on de-identification validation to be increased if the person may still be identified or decreased if resemblance is not sufficiently maintained.

For each selected feature, one or more feature face-model may be selected 3030 from the pre-provided feature face-models, or being generated as described above (e.g. based on pre-stored coded instructions, using machine/deep learning techniques and in accordance with parameters and measures of the selected face). The feature face-model may be selected to include a corresponding feature that has high similarity to that selected for processing. Accordingly, the feature face-model may be selected in accordance with one or more of the following parameter: age similarity, skin color similarity, feature shape similarity, as well as in accordance with estimated sex of the face and face-model. It should be noted that each selected feature may be processed and varied using one or more feature face models (being pre-stored and obtained and/or generated as described above), with similar or different variation levels (thresholds). Moreover, different features of a selected face may be varied using the same or different one or more feature face models.

The selected feature face model, or the facial feature thereof, may be applied onto the selected feature of the face region for processing and may be used for applying suitable variation/morphing to a selected feature threshold 3040. Accordingly, the "original" feature of the selected image region may be morphed in accordance with the corresponding feature of the selected feature face-model by one or more image processing/variation technique. For example, this may be applied using Poisson blending, seamless cloning and/or alpha-blending of selected face-model feature onto the selected "original" feature. More specifically, the feature geometry may be varied by stretching or narrowing, color tone may be varied, certain level of fading between image layers (original feature layer to face-model feature layer) may be applied, up to a selected threshold (e.g. up to 20%, 50% or 60%), which may be varied in accordance with de-identification validation.

Figure 5:
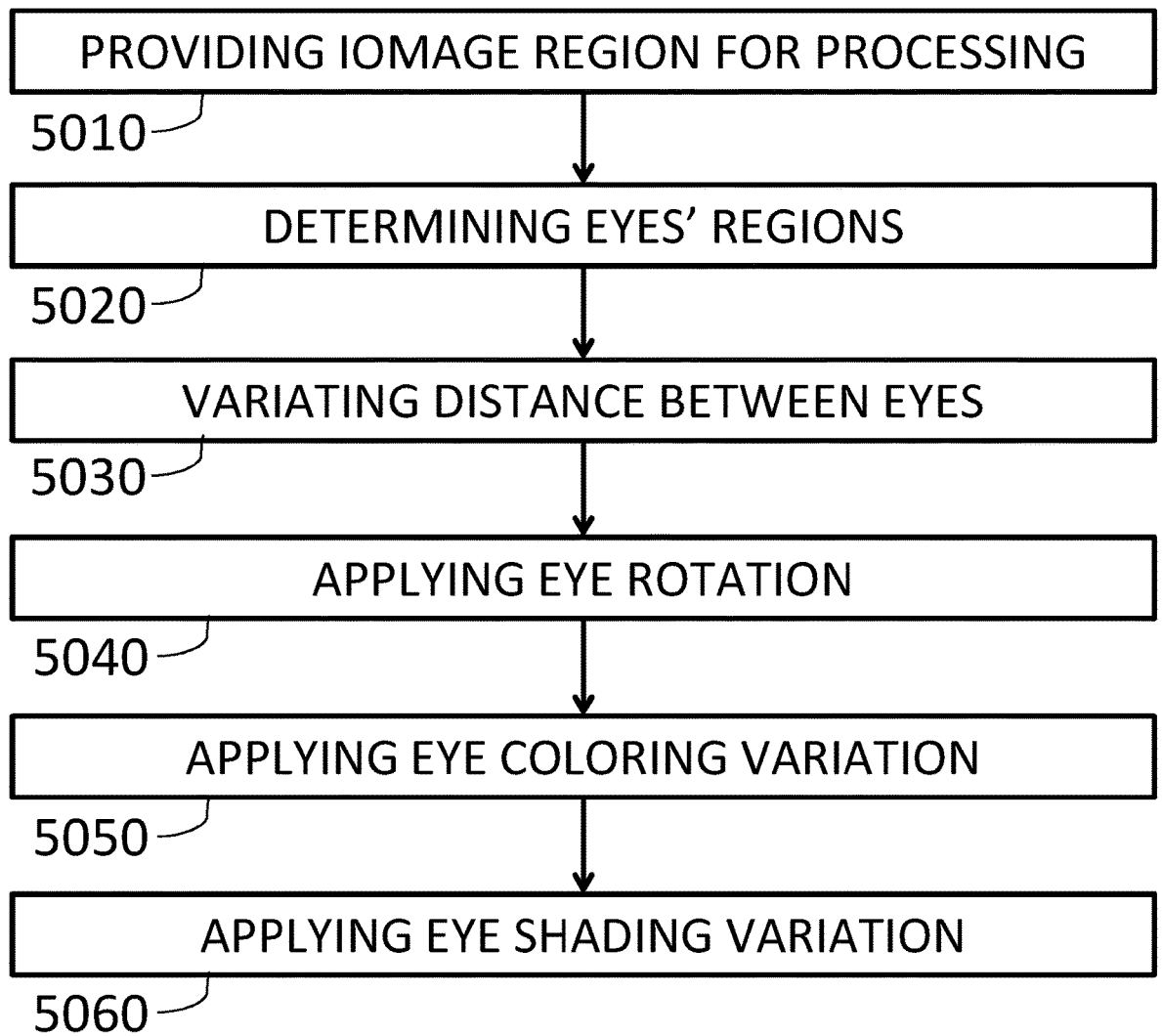
FIG. 5 schematically illustrates eye enhancing technique, according to some embodiments of the invention.

In addition to geometry and feature de-identification, the de-identification processing, according to some embodiments, may also include additional variation of face features. This includes general distance variations exemplified in FIG. 4 and/or eye enhancement processing exemplified in FIG. 5. FIG. 5 exemplifies, in a way of a flow chart, a technique for use in de-identification of faces in image data. Some embodiments may include receiving or providing data associated with image region for processing 4010, the image region typically includes at least one face image to undergo de-identification processing. Some embodiments may further include selection of facial features 4020, typically pair of features or distances between them, the selected features and distances may be processed for determining data on suitable variation ratios 4030, for instance in accordance with the determined variation ratios a distance variation (and/or scale and/or rotation variation) may be determined 4040 and may be applied to the image region 4050.

The distance variation technique may be generally directed at varying distances, or distance ratios between facial features in accordance with various aesthetic and psychological aspects, e.g. golden ratio $\phi \approx 1.618$ considered to be associated with aesthetic. The distance variation technique may be operated once or several times on a selected face in accordance with selected preferences of the technique. At each run, the technique may be based on selection of facial features or distances between features 4020 and operating for determining ratio between selected distances and suitable variation options 4030. As indicated, the suitable variation options may be determined to provide increased aesthetic character to the resulting image, such as varying some distance ratios to be closer to the golden ratio φ, to provide increased symmetry etc. For example, selected features/distances may include mouth width, lips' thickness, nose length, nose width, ears' length/height, eyebrows length and thickness, chick bones height distance between eyes, eyes' width etc. Based on the suitable variation options, some embodiments may include determining a variation to be applied 4040. Such variation may generally be selected in accordance with selected level of de-identification, and may include certain random variation. For example, the selected variation may be associated with an increase of between 5% to 10% to distance between selected facial features such as mouth to nose etc., the selected variation may be a selected number within the suitable range. In accordance with determined face geometry, some embodiments may select distance variation being randomly selected within the range of suitable variations, or for some geometries the proper selection may be at the boundaries of suitable variations, e.g. maximized distance variation, or no variation at all. Further, the image data region may be transformed 4050, e.g. utilizing affine transformation techniques, for varying the selected distance ratios in according with the selected variation levels.

The distance variation technique typically includes variation of distances associated with the eyes together with other facial features. However, as the eyes typically receive greater weight in face recognition techniques, a dedicated eye transformation may increase de-identification of faces in image data. To this end, FIG. 5 exemplifies eye enhancing technique suitable for use in this technique in a way of a flow chart. Generally, various face recognition techniques utilize parameters associated with the eyes to a level that may be greater with respect to other facial features for determining identity of people in images. To this end, some embodiments may provide additional eye variation/enhancement for further preventing, or at least significantly limiting, identification ability. The eye enhancement processing generally includes providing image region for processing 5010, determining eyes' region of the face 5020, determining eye distance variation 5030, applying eye rotation 5040, applying selected eye coloring variation 5050 and applying eye shading variation 5060.

Generally, the eye enhancement technique may utilize image processing techniques for determining 5020 location and parameters of the right and left eyes within the selected image region. Such parameters may generally include physical size (in pixels), distance between eyes, eyes' orientation, color tone of pupil and sclera regions, shades under or over eye regions etc. The eye enhancement may be based on the assumption that face recognition techniques utilize image data associated with eye to a greater extent than other facial feature for determining identity of a person. Additionally, some embodiments may be directed at considering aesthetics of the resulting output image data in addition to de-identification of the image data. To this end, the eye enhancement technique may preferably be directed at varying eyes' parameters while considering one or more aesthetic parameters. For example, in determining eye distance variation 5030 some embodiments may operate for determining an acceptable variation in distance between eyes. The acceptable variation may be determined in accordance with current (or original) distance between the eyes and its relation with other distance measures in the image region associated with the processed face. Such additional measures may include distance between ears, nose width, eyes' width, mouth width and other width related features. Generally, some embodiments may determine a positive distance variation, i.e. determining new eye distance that is larger with respect to original eye distance. Typically, the eye distance variation may be determined within a selected threshold of few percent of the given eye distance. The selected threshold may also be determined in accordance with width features of the face being processed.

In addition to varying distance between eyes, the eye enhancement technique may operate for selectively rotating the eye regions 5040. Generally, some embodiments may utilize image processing and analyzing techniques for determining angular orientation of the right and left eyes with respect to an estimated horizontal plane, and determine level of angular variation to the eyes' orientation. Some embodiments may align eyes' orientation with an estimated horizontal plane (based on the processed image data) and/or vary eyes' orientation to increase symmetry between eyes.

The eye enhancement technique may further include eye coloring variation 5050 and eye shading variation 5060. The eye coloring variation 5050 relates to determining color of the sclera region of the right and left eyes and generally applying a selected eye coloring affecting the color toward white color. The eye coloring 5050 may also include affecting color of the pupil region but a selected color variation. The eye shading variation 5060 includes determining color distribution of shaded regions above and below and eyes and determined corresponding shade tone variation. Typically, for aesthetic considerations, some embodiments may select darker shades for female and brighter shades for male face images. The selected shading tone or color may typically be selected to be a small variation in color, while being determined in accordance with color tones of the face regions surrounding the eyes and lighting within the image data being processed.

Generally, as indicated above, the de-identification processing may include one, two or all three of the above described embodiments including geometrical de-identification 1040, feature de-identification 1050 and eye enhancement 1060. These image variation/processing techniques may relate to variation of selected features associated with image region selected for de-identification processing (e.g., selected face region). Some embodiments may also include addition of noise layer 1035 on top of the so-processed image region (face region). Such noise layer may include certain pattern of pixel color variation corresponding to selected shapes/structures, which may or may not be associated with face. For example, the noise layer may include pattern having about 1%-80% opacity and associated with an image of (randomly) selected face-model, selected animal or any other shape of structure. In some embodiments, the noise layer may be associated with general random noise and/or adversarial noise. Such noise layer may be used for directing face recognition algorithms to misrecognize the selected processed image region as being something other than a face and/or wrongly identify the identity of the selected face.

Some embodiments may include de-identification validation processing 1080 in FIG. 1B. The validation processing may be applied on each image data piece after de-identification processing, applied periodically or randomly on selected processed images to determine and/or update selected thresholds or applies when operated as a calibration status to thereby monitor de-identification processing abilities. The de-identification validation processing 1080 may include providing original and processed image data pieces for face recognition processing by one or more existing face recognition programs, receiving output of the face recognition processing and comparing resulting confidence values scores to a predetermined success threshold. Additionally, the de-identification validation processing may include determining a similarity measure between the original selected face and the resulting face after de-identification processing. The similarity measure may be determined in accordance with general similarity, while not considering parameters that may be used for face identification/recognition. This may be carried out to enable face de-identification while maintaining certain resemblance between the original and processed image data. For example, the similarity measure may be determined by determining one or more of the following parameters including peak signal to noise ratio (PSNR), histogram comparison, structural similarity (SSIM), distances vector set (e.g. using active appearance model (AAM) or active shape models (ASM) feature extraction techniques), deep learning classifier, pose estimator, and other similarity prediction in terms of human vision using machine learning or deep learning techniques. The similarity measure may be directed at measuring how much the processed image is different from the original input image data. The similarity measure may be used for observing the entire image region while not being limited to facial features associated with face identity to provide aesthetic similarity for a de-identified image.

The de-identification validation processing may provide data on ability of face recognition programs/techniques in identifying a person based on face appearing in the image data and on general/aesthetic and/or human vision similarity between the original image data and the processed image data (or the selected one or more faces in the image data). This validation processing may be provided for determining and/or updating selected thresholds as well as for selecting different de-identification techniques and operating geometrical de-identification, feature de-identification, eye enhancement, two of them or the three processing techniques to provide efficient limiting of face recognition of the processed image data.

Figure 6:
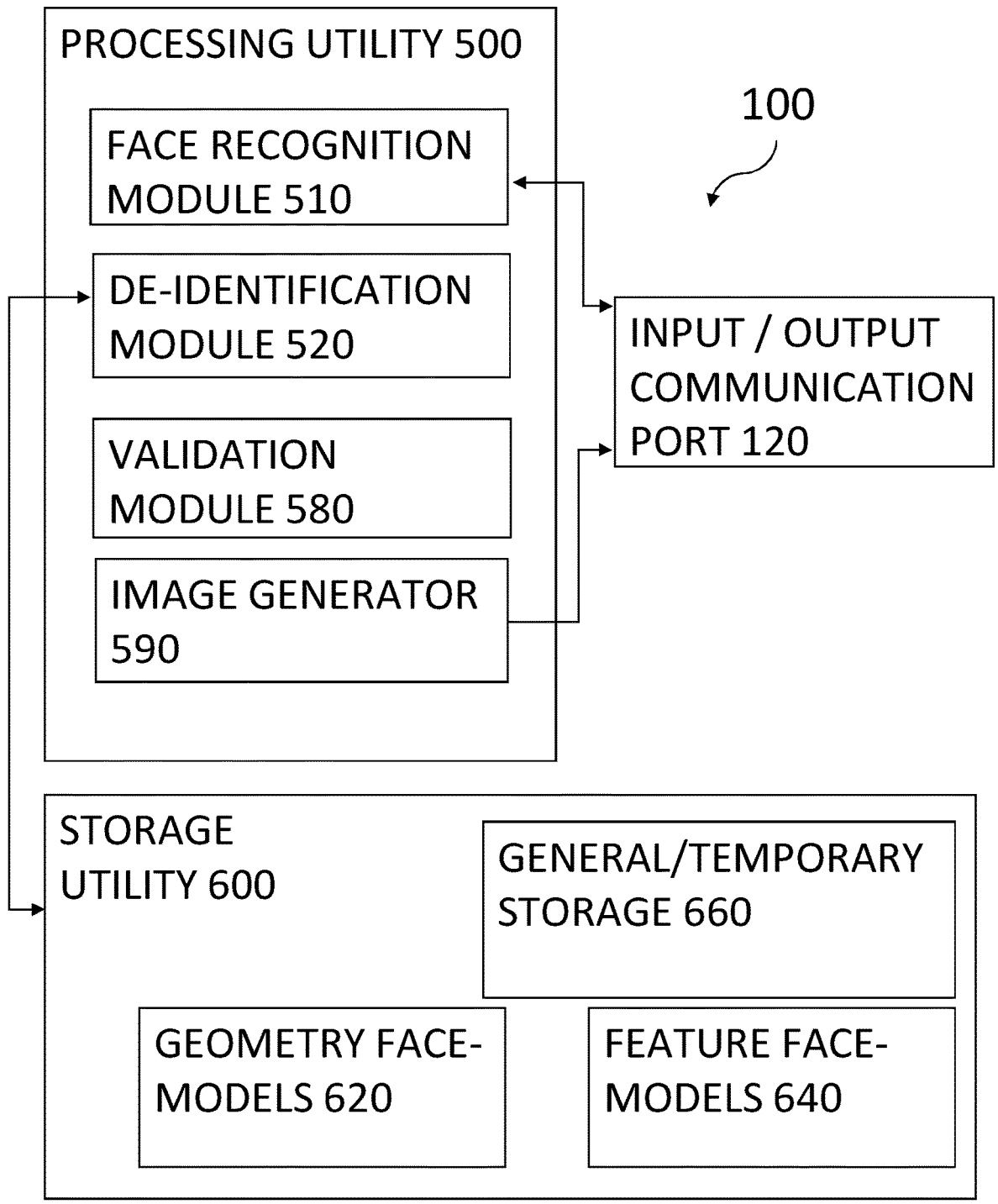
FIG. 6 schematically illustrates a system for de-identification input image data, according to some embodiments of the invention.

As indicated above, some embodiments may be implemented by a de-identification system having at least one processing utility and at least connectable to a storage utility pre-stored with the above described face-models. Such a system may be associated with one or more server systems configured for communication with one or more user for receiving input image data stream and transmitting corresponding output image data including one or more selected de-identified face regions through a communication network. Additionally or alternatively, the system may be a local system configured for receiving input image data stream through communication port and/or directly from a camera unit associated therewith. Reference is made to FIGS. 6 and 7 schematically illustrating a system 100 according to the present invention (FIG. 6) and a de-identification module 520 (FIG. 7) configured for implementing the above described embodiments on input image data stream.

FIG. 6 illustrates schematically a system 100 including a processing utility 500, input/output communication port 120 and storage utility 600, and may be configured for receiving input image stream and for processing the input image stream for de-identifying selected faces in one or more images of the input image stream. The processing utility 500 may be configured for receiving the input image stream and providing selected processing thereto using one or more software and/or hardware modules for de-identifying selected faces. The processing utility 500 may include face recognition module 510, de-identification module 520, validation module 580 and image generator 590. The storage utility 600, which may be directly connected to the processing utility or connectable through a communication network, generally includes face-models database such as geometry face-models 620 and features face models 640 and may also include a general/temporary storage section for typical processing data, threshold functions data etc.

The processing utility 500 may be configured for receiving input image stream for processing, the image stream may include one or more images that may be associated between them or may be separate, in the meaning that each picture relates to a different scene and/or includes different peoples' faces. The face recognition module 510 analyzes the input image data to determine image regions associated with faces suitable for de-identification processing. Typically, such image regions include faces that may be identified using face detection techniques, for example, faces facing to the camera and being sufficiently large (in number of pixels). Selection of image regions or faces for de-identification may include receiving input selection data from a user indicating faces to be de-identified.

The de-identification module 520 may be configured for receiving selected image regions for de-identification processing and for applying the above described de-identification technique using one or more selected face-models pre-stored in the storage utility 600. The de-identification module 510 may be operable for de-identification processing faces in the selected image region as described above, and, in some cases, transmitting the so-processed image data to the validation module 580 for de-identification validation as described above. It should be noted that the de-identification validation may be provided as an option, be selectively applied and/or be used for calibration of threshold parameters. For example, when the system may be configured as a camera unit including de-identification processing utility 500, the validation module may not be a part of the processing utility and may be used for quality assurance as an external module Finally, the image generator 590 may receive the processed image region(s) and generate output image stream, by stitching the processed image regions and packing them into image data of selected format such as video data, one or more images or any other selected format.

FIG. 7 illustrates schematically the de-identification module 520 and corresponding software and/or hardware modules thereof. The de-identification module 520 may include one or more of geometry de-identificator 530, features de-identificator 540, distance variation module 550, eye enhancer and/or noise addition layer 560. Each of the modules 530-560 may be configured for processing selected image regions in accordance with the above described embodiments for varying selected elements of the image region.

The geometry de-identificator 530 may be configured and operable for determining geometry measure of selected face in the image region, transmitting a request to the storage utility 600 for one or more suitable geometry face-models and applying geometrical variation to the selected face. The features de-identificator 540 may be configured for selecting, e.g. in accordance with user instructions, one or more facial features for processing, obtaining corresponding features face-models from the storage utility 600 and applying suitable variation to the selected features in accordance with features of the face-models as described above. The distance variation module 550 may be configured for affecting the image region for determining general variations to selected distances between facial features, typically to increase symmetry and/or aesthetic of the face (e.g. by affecting selected ratios to be closer to ϕ≈1.618 or further for said ratio). The eye enhancer may be configured for determined and applying variation to eyes' distances, orientation, coloring and/or shading as described above. Generally, as indicated above, the de-identification module 520 may also include a noise addition module 560 configured for generating and applying a noise layer on top of the selected image region(s) as described above. Generally, the de-identification module 520 may operate selected one or more of the de-identificators as well as determine and operation order in accordance with input operation preferences pre-provided and/or provided by a user with the input image stream.

As described above, some embodiments may provide eliminating, or at least significantly reducing, ability of identifying personal identity by processing image data using computer face recognition techniques. This may be carried out while maintaining at least some resemblance between the output processed image data and appearance in the input image data. Some embodiments may provide various de-identification levels and techniques such that some variation techniques may be applied with selected thresholds. This may be carried out while increased (and/or optimized) de-identification may utilize additional, or all of the above described embodiments for optimized results, at the cost of greater variation from the original image data.

Generally, some embodiments may be controlled by a master protocol or deep learning module, configured for selecting procedure to be applied (geometry de-identification, feature de-identification, distance variation, eye enhancement, noise layers etc.) and variation levels/thresholds in accordance with desired level of privacy (de-identification level). As indicated above, the processing of image data pieces may be validated by determining ability of face recognition techniques for identifying identity of people in the image data, and/or measured similarity in terms of human vision, for determining that the de-identification is sufficient, overdone or insufficient, and update the processing protocol accordingly. The updated processing protocol may include additional de-identification techniques, in case not all the above described embodiments may be used, and/or update variation levels and thresholds.

Accordingly, some embodiments may provide using entities with the ability of using images while protecting their identity from being determined based on the published images, while maintaining appearance of familiarity by maintaining similarity in terms of human vision between the resulting output images and the appearance of individual in the original images.

It should be appreciated that while the abovementioned embodiments may relate to face recognition, similar embodiments of de-identification may also be applied to other types of image processing for identification (e.g., scanning images to identify, fingerprints, retina scans, gate from a video clip, etc.) with the corresponding alterations to the process, for example modifying fingerprint image instead of a face image. Furthermore, while modification of images is discussed above, similar embodiments of de-identification may also be applied to other types of media data, for instance modifying text, audio, etc. For example, in a text file a region of identification may be defined for a specific portion of the media text file and during the de-identification process, that region of identification may be modified until a similar text file may be generated that may no longer be recognized by text recognition algorithms (similarly to the face recognition algorithms discussed above), while still understandable and/or readable to humans.

Figure 8:
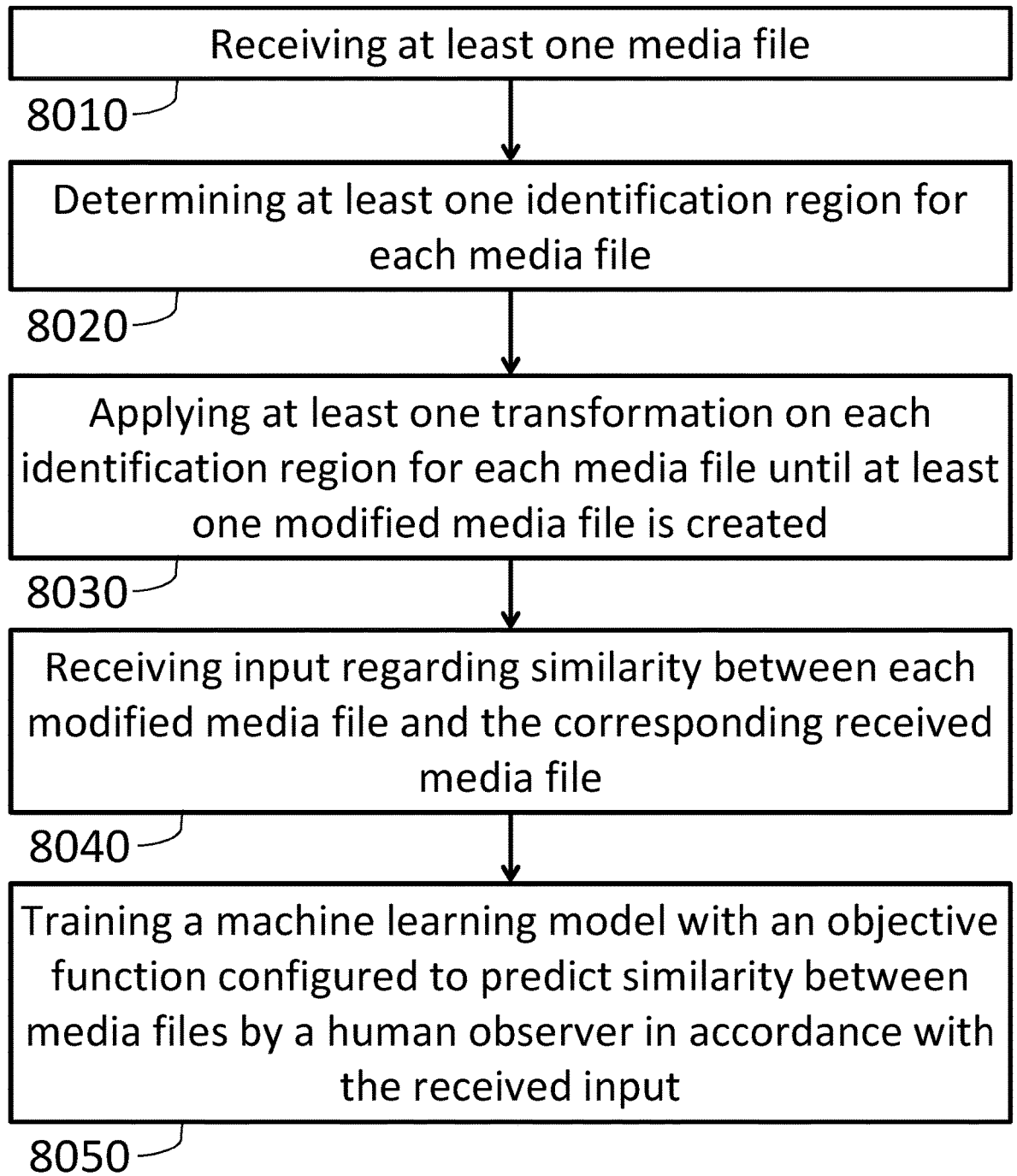
FIG. 8 shows a flowchart for a method of training a human perception predictor to determine level of perceived similarity between data samples, according to some embodiments of the invention.

Reference is now made to FIG. 8, which shows a flowchart for a method of training a human perception predictor to determine level of perceived similarity between data samples, according to some embodiments. As mentioned above a computerized device may be trained (e.g., with machine learning or deep learning) to create a "human vision" predictor configure to recognize similarity between media files similarly to the perception of an actual human, for example recognizes that two images display similar faces or that two audio files include similar music.

According to some embodiments, such human perception predictor may be trained by receiving 8010 at least one media file (e.g., image, audio, etc.) and determining 8020 at least one identification region (e.g., a face or audio track) for each media file. In some embodiments, at least one transformation (e.g., geometrical transformation for image files or pitch transformation for audio files) may be applied 8030 on each identification region for each media file until at least one modified media file may be created.

In some embodiments, input regarding similarity between each modified media file and the corresponding received media file may be received 8040. For instance, the input may be received 8040 from a dedicated database and/or from a focus group of users labeling or answering questions about similarity between media files (e.g., images, text, audio, etc.). In the case of a focus group of users answering questions about similarity between media files, the focus group of users may be presented with two (or more) media files and some questions regarding the similarity, for example which image (e.g., or audio file) may be most similar to the original image (e.g., or audio file), for instance, on a scale from 1 to 10 thereby creating a human similarity parameter for each media file. In some embodiments, the modified media files presented to the focus group of users may be media files for each type of transformation and combinations thereof so as to receive the be most suitable similarity to the original media file. In some embodiments, the applied transformation may cause reduction of confidence value (and/or mis-identification) for the corresponding received media file by at least one classifier, and the modified media files presented to the focus group of users may be modified media files that failed a classifier algorithm (e.g., mis-identified by a face recognition algorithm) on a scale (e.g., 1-10) as determined by the particular algorithm, such that a classifier parameter may be created for each media file.

In some embodiments, a machine learning model (e.g., a shallow/deep neural network) may be trained 8050 with an objective function configured to predict similarity between media files by a human observer in accordance with the received input.

In some embodiments, the media file may include an image with multiple pixels, and wherein validity of the identification region may be maintained while balancing modification of each pixel with the corresponding modification to neighboring pixels in the media file. In some embodiments, when a new media file is received after the human vision machine may be trained, at least one new identification region (e.g., a face) for the new media file may be determined, and the new identification region may be converted to a feature vector with at least one transformation applied on the feature vector in accordance with the trained machine learning model in order to generate a synthetic media file by reconstruction of the transformed feature vector.

According to some embodiments, a parametric model may be trained on a dataset of identification regions to synthesize a media file given a set of parameters and the parameters representing the selected identification region may be obtained as depicted in the received at least one media file, with modification of the parameters to represent a modified version of the identification region so as to maximize and/or retain resemblance to the identification region of the received at least one media file while reducing the recognition score of the at least one classifier below a predefined threshold.

Figure 9:
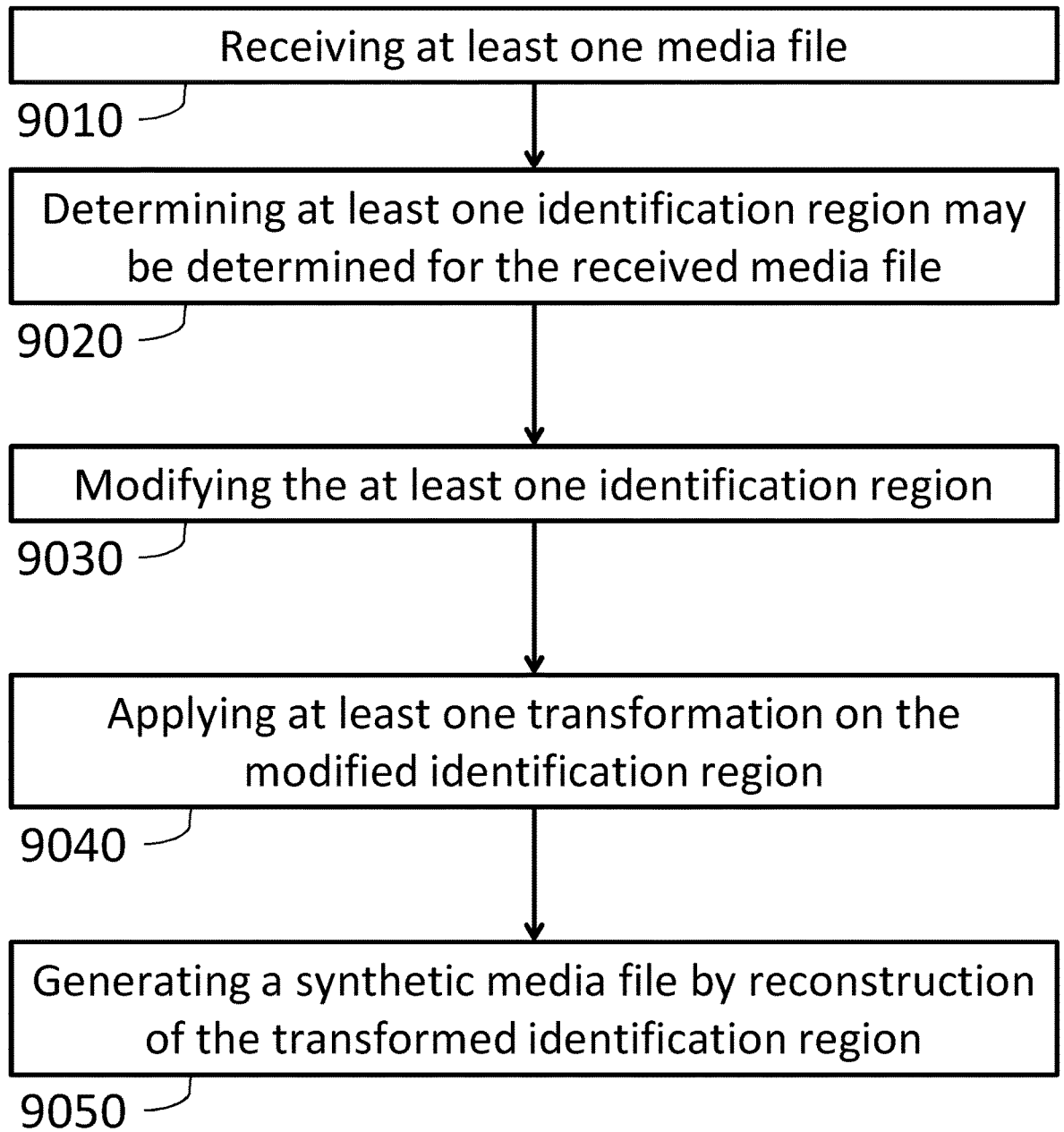
FIG. 9 shows a flowchart for a method of synthesizing media files, according to some embodiments of the invention.

Reference is now made to FIG. 9, which shows a flowchart for a method of synthesizing media files, according to some embodiments. In some embodiments, at least one media file may be received 9010, and at least one identification region (e.g., a face) may be determined 9020 for the received media file (e.g., image, video, audio, text etc.).

In some embodiments, the at least one identification region may be modified (e.g., converted and/or modified for instance at each pixel in image files) 9030 to a feature vector, with at least one transformation (e.g., geometrical transformation) applied 9040 on the feature vector, for example applied on each pixel in an image file while taking into consideration the effect on the neighboring pixels. In some embodiments, a synthetic media file may be generated 9050 by reconstruction of the transformed feature vector, such that the generated file may be de-identified. In some embodiments, reconstruction of the transformed feature vector may include at least partial prediction of missing parts. In some embodiments, the applied transformation may cause reduction of confidence value (and/or mis-identification) for the corresponding received media file by at least one classifier, and wherein the generated synthetic media file may be determined to be similar to the received image file by a simulator of human perception.

According to some embodiments, the simulator of human perception may include a machine learning model trained by receiving at least one media file, determining at least one identification region for each media file, applying at least one transformation on each identification region for each media file until at least one modified media file is created, receiving input regarding similarity between each modified media file and the corresponding received media file, and training a machine learning model with an objective function configured to predict similarity between media files by a human observer in accordance with the received input. In some embodiments, the objective function may be, for example, an optimization scheme with input terms for similarity and/or mis-identification (and or confidence value reduction), wherein the optimization process may be utilized to generate a modified media file to fool or by mis-identified by a classifier (e.g., a face recognition algorithm) while achieving the highest similarity (for instance based on the results of the simulator of human perception).

In some embodiments, the synthetic media file may be generated in accordance with at least one parameter of confidence value reduction and/or mis-identification (e.g., on a scale of 1-10) and at least one parameter of similarity (e.g., on a scale of 1-10) to the corresponding received media file, such that their average (e.g., also on a scale of 1-10) may determine a de-identification threshold for filtering out future result. For example, the de-identification threshold may be determined to be 0.7 and any generated synthetic media file with a lower score may not pass the de-identification threshold.

In some embodiments, a parametric model may be trained and/or optimized on a dataset of identification regions to synthesize a media file given a set of parameters, with the parameters representing the selected identification region obtained as depicted in the received at least one media file and modification of the parameters to represent a modified version of the identification region so as to maximize and/or retain resemblance to the identification region of the received at least one media file while reducing the recognition score of the at least one classifier below a predefined threshold.

According to some embodiments, when a new media file is received, that media file (e.g., an image) may be converted, e.g., by an encoder, to a feature vector and after at least one transformation a loss function may be applied onto the modified image with balancing between a classifier algorithm (e.g., for face recognition) and a human simulator machine for the original and modified images. Thus, the loss function may be iteratively minimized with updating of the encoder until a synthesized image may be generated to simultaneously "fool" classifier algorithms and be recognized by the human simulator machine.

According to some embodiments, a system for training the abovementioned human perception predictor to determine level of similarity between data samples may include: a dataset of identification regions and at least one processor, coupled to the dataset of identification regions, wherein the at least one processor may be configured to: receive at least one media file, determine at least one identification region for each media file, convert each identification region to a feature vector, apply at least one transformation on each feature vector, reconstruct the transformed feature vector to a reconstructed media file, receive input (e.g., from a focus group) regarding similarity between each reconstructed media file and the corresponding received media file, and train a machine learning model with an objective function configured to predict similarity between media files by a human observer in accordance with the received input. In some embodiments, the applied transformation may cause reduction of confidence value (and/or mis-identification) for the corresponding received media file by at least one classifier, and wherein the trained machine learning model may be configured to predict similarity between media files by a human observer.

In some embodiments, validity of the identification region may be maintained while balancing modification of each pixel with the corresponding modification to neighboring pixels in the image.

In some embodiments, the processor may be further configured to receive a new media file, determine at least one new identification region for the new media file, convert the new identification region to a feature vector, apply a transformation on the feature vector in accordance with the trained machine learning model, and generate a synthetic media file by reconstruction of the transformed feature vector.

According to some embodiments, a de-identification method may allow protection personal attributes from being estimated, by significantly reducing the ability to associate a given facial image with the subject's true personal attributes. Such attributes may be physical and/or mental, permanent and/or temporary. These include age, health and mental condition, gender, sexual orientation, ethnicity, weight, height, pregnancy, mood/feelings, IQ and socio-economic variables.

Given a facial input image, at least one of the geometry, the colors and the textures of the input face image (and/or other media file) may be modified. The transformations may be optimized to maintain similarity to the input image (as much as possible), while reducing statistic-correlation between the depicted face and its true attributes which are to be protected. Ultimately, the correlation may be reduced significantly enough to eliminate the possibility to associate the true attributes with the depicted face. Thus, the privacy of individuals may be protected by reducing the likelihood that one or more of the mentioned above attributes will be estimated.

In some embodiments, at least one of the following transformations may be used for de-identification of facial images (while similar methods may apply for other media types with the necessary adjustments): applying a controlled deformation of facial features, changing the distances between facial features, embedding textures and/or colors of facial features, and adding a noise layer, generated with a specific pattern.

In some embodiments, an input image depicting one or more faces may be received and an attribute-protection processing may be applied to one or more selected faces. The attribute-protection process may include of at least one of the transformations above.

In some embodiments, applying a controlled deformation of facial features may include using the one or more face models from a pre-stored data, generating a new model by using a weighted average of the models' geometry, and warping the original image to match the new model's geometry. The warping may be done on one or more facial features and/or the distances between them. The model's selection may take into account the perceptual similarity to the input face geometry, the attractiveness of the model and/or the result and the likelihood to reduce the statistical correlation to the true attributes being protected. Alternatively or additionally, the deformation may be carried out using an optimization process, by maximizing the perceptual similarity for humans, while reducing the statistical correlation between the facial image and the true attributes of the depicted face. Alternatively or additionally, the deformation may be carried out using a pre-trained generative model (e.g., deep neural network) trained to maximize the perceptual similarity for humans, while reducing the statistical correlation between the facial image and the true attributes of the depicted face.

In some embodiments, changing the distances between facial features may include selecting one or more pairs of facial features of the selected face, determining suitable distance variation for the selected pairs of facial features and applying the selected distance variation for varying one or more selected ratios of the selected face.

In some embodiments, embedding textures and/or colors of facial features may include selecting one or more facial features of the selected face and obtaining from a storage unit containing pre-stored set of feature face-models, one or more feature face-models having facial similarity measure with the selected face, being above a selected feature similarity threshold, and processing the image region for applying variation to said one or more selected facial features using corresponding facial features of said selected one or more features face-models to a predetermined feature variation level, generating an output image data wherein said selected image region presenting varied version of said selected face. Selecting the facial features may be wherein said one or more general similarity measures comprises one or more of L2, peak signal-to-noise ratio (PSNR) similarity measure, histogram comparison, distances vector set measure, and a feature vectors extracted using a deep-neural-network (trained using the "Siamese" architecture).

Alternatively or additionally, the substituting features may be achieved using a synthesizing process, optimized to maximize the perceptual similarity for humans while reducing the statistical correlation between the facial image and the true attributes of the depicted face. (i) A pre-computation of a set of small patches (e.g., of 8×8 pixels), that describe distinctive "building blocks" of facial features (e.g. common type of edges, corners, and textures). (ii) An optimization process that maximizing the similarity of each small block in the synthesized to one of the pre-computed patches and the similarity to the original facial feature.

Alternatively or additionally, the texture synthesis method may use a generative neural network that may be pre-trained to generate good results in the sense of maximizing the similarity to the original facial feature, while having only part of the original data as input (e.g., with some degrading transformation, like down-sampling, projection to a lower-dimensional linear basis (e.g. using PCA, or ICA), and/or edge detection). The texture synthesis may further include a blending component that reduces the visibility of the seam between the blended and the original parts of the image.

In some embodiments, adding a noise layer, generated with a specific pattern may include using an optimization process for generating a noise in a specific structure that may be invisible to the naked eye or virtually-invisible, while iteratively modifying the noise layer until the selected attribute-estimation algorithms yields a false result in respect of the attribute to be protected. Alternatively, generating the noise layer may include running one or more forward pass(es) of a pre-trained generative model (e.g., deep neural network), trained to generate a noise layer, with minimal visibility to the human-naked-eye while reducing the likelihood of attribution-estimation algorithm to yield a correct result. The balance between these two terms of the objective function may be determined manually or automatically.

According to some embodiments, the order of performing the above transformations, as well as their parameters, may be optimized given a specific input image (or other media file), and/or determined using a machine-learning algorithm according to a pre-learned model. In either case, the optimized objective function (machine learning algorithms may be optimized towards an objective function in the training phase) may minimize the likelihood of the image subject to be vulnerable for being associated with its true protected attributes, while maximizing the perceptual similarity to the original face.

The optimization processes may be iterative or non-iterative. In the iterative case, it may include a validation step against one or more attribute estimation algorithms, and modify the transformation parameters and their order, in order to provide a better result.

Alternatively, or additionally, the parameters and the order of transformations may be predetermined by a trained machine-learning-model (e.g., deep neural network) to achieve a good result in the sense of maintaining the similarity to the reducing the likelihood of an attribute-estimation algorithm to provide a correct estimation.

It should be noted that the facial features may refer to natural features (e.g., eyes, nose, lips, etc.) and/or by artificial features (e.g. arbitrary points in the face), determined to maximize the flexibility of the method.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method for de-identification processing of image files whilst maintaining a level of similarity between an original and a modified image file, the method comprising:
   receiving at least one image file;
   determining, for the at least one image file, at least one face for de-identification processing;
   applying at least one transformation on the at least one face to create at least one modified image file, thereby limiting identification by computerized algorithms; and
   validating the at least one modified image file by:
      receiving, from a computerized human vision predictor trained to recognize similarity between image files similarly to the perception of an actual human, a measure of human-perceptual similarity between the at least one modified image file and the corresponding received image file;
      receiving a recognition score from an existing computerized face recognition algorithm configured to identify the at least one face in the at least one modified image file;
      determining if the measure of human-perceptual similarity exceeds a visual similarity threshold and if the recognition score is below a de-identification threshold; and
      iteratively updating the at least one applied transformation and applying such updated transformation to the received at least one image file if either the recognition score is not below the de-identification threshold or the measure of human-perceptual similarity does not exceed the visual similarity threshold, else outputting the modified image file.

2. The method according to claim 1, further comprising:
   training a parametric model on a dataset of face to synthesize an image file given a set of parameters;
   obtaining the parameters representing the selected face as depicted in the received at least one image file; and
   modifying the parameters to represent a modified version of the face so as to retain resemblance to the face of the received at least one image file while reducing the recognition score of the at least one classifier below a predefined threshold.

3. The method according to claim 1, wherein the human perceptual similarity of image files is determined in accordance to at least one of: geometrical similarity, texture similarity and identity similarity.

4. A method of synthesizing media files, the method comprising:
   receiving a media file;
   determining at least one identification region for the received media file;
   modifying the at least one identification region;
   applying at least one transformation on the modified identification region;
   generating a synthetic media file by reconstruction of the transformed identifications region;
   repeating applying and generating until the applied transformation causes reduction of confidence value for the corresponding received media file by at least one classifier, wherein the generated synthetic media file and the received media file are recognized as including similar faces by a simulator of human perception;
   training a parametric model on a dataset of identification regions to synthesize a synthesized media file given a set of parameters;
   obtaining the parameters representing the identification region as depicted in the received media file; and
   modifying the parameters to represent a modified version of the identification region so as to retain resemblance to the identification region of the received media file while reducing the recognition score of the at least one classifier below a predefined threshold.

5. The method according to claim 4, wherein modifying the at least one identification region comprises converting the at least one identification region to a feature vector, wherein the synthetic media file is reconstructed from the feature vector.

6. The method according to claim 4, wherein the synthetic media file is generated in accordance with at least one parameter of confidence value reduction and at least one parameter of similarity to the corresponding received media file.

7. The method of claim 1, wherein applying the at least one transformation on the at least one face to create at least one modified image file comprises converting the face to a feature vector, applying at least one transformation on the feature vector, and reconstructing the transformed feature vector thereby generating the modified image file.

8. The method of claim 7, wherein the at least one transformation is at least one of a geometric transformation, or a color transformation.

9. The method of claim 4, wherein modifying the at least one identification region comprises converting the identification region to a feature vector, applying at least one transformation on the feature vector, and reconstructing the transformed feature vector thereby generating the modified media file.

10. The method of claim 4, wherein the media file comprises an image file and wherein the identification region comprises a face.

11. The method of claim 1, wherein updating the at least one applied transformation is performed in an optimization process with an objective function that maximizes the measure of human-perceptual similarity while reducing the recognition score.

12. The method of claim 4, wherein repeating applying and generating is performed in an optimization process with an objective function that maximizes a measure of human-perceptual similarity of a simulator of human perception while reducing the confidence value for the corresponding received image file by the at least one classifier.

* * * * *